US005836160A

United States Patent [19]

Chang

[11] Patent Number: 5,836,160

[45] Date of Patent: Nov. 17, 1998

[54] HYDRAULIC SYSTEM FOR DRIVING AXIAL PISTON TYPE HYDRAULIC MOTOR

[75] Inventor: Sung Kyo Chang, Changwon, Rep. of Korea

[73] Assignee: Samsung Heavy Industries Co., Ltd., Rep. of Korea

[21] Appl. No.: 762,917

[22] Filed: Dec. 10, 1996

[51] Int. Cl.[6] .................... F16D 39/00

[52] U.S. Cl. .................... 60/489; 60/493; 60/494

[58] Field of Search .................... 60/468, 487, 489, 60/490, 493, 494

[56] References Cited

U.S. PATENT DOCUMENTS

| | | | |
|---|---|---|---|
| 3,736,753 | 6/1973 | Roth | 60/489 |
| 4,480,963 | 11/1984 | Ring . | |
| 4,690,036 | 9/1987 | Kosaka et al. . | |
| 4,712,377 | 12/1987 | Yoshida et al. | 60/493 X |
| 4,768,340 | 9/1988 | Hamilton | 60/493 X |
| 4,771,676 | 9/1988 | Matsumoto et al. . | |
| 4,915,016 | 4/1990 | Burandt . | |
| 5,042,251 | 8/1991 | Berthold | 60/489 X |
| 5,211,015 | 5/1993 | Schroeder | 60/489 X |
| 5,379,678 | 1/1995 | Schulze . | |
| 5,488,894 | 2/1996 | Schröder . | |

*Primary Examiner*—Hoang Nguyen
*Attorney, Agent, or Firm*—Harness, Dickey & Pierce, P.L.C.

[57] ABSTRACT

A hydraulic system for driving an axial piston type hydraulic motor wherein a swash plate can tilt at a right angle relative to a shaft. The hydraulic system comprises a swash plate cylinder; a double-acting swash plate piston disposed in the swash plate cylinder; one rod end of which is connected to the swash plate; a pair of springs disposed in the swash plate cylinder for biasing the swash plate piston; a swash plate piston control valve for selectively connecting one of the swash plate piston chambers to a hydraulic pump or, alternatively, for interconnecting the chambers of the swash plate piston; an inlet passage installed between an inlet port of the hydraulic motor and a hydraulic pump; an outlet passage installed between an outlet port of the hydraulic motor and a tank; a main control valve installed in the inlet passage for opening or closing the inlet passage in response to a predetermined signal; a passage switching valve installed in the outlet passage for opening or closing the outlet passage in response to a predetermined signal; a bypass passage installed in the outlet passage wherein each end of the bypass passage is connected to a predetermined position before and after the passage switching valve; and a relief valve installed in the bypass passage.

3 Claims, 1 Drawing Sheet

HYDRAULIC SYSTEM FOR DRIVING AXIAL PISTON TYPE HYDRAULIC MOTOR

BACKGROUND OF THE INVENTION

1. Field of the Invention

The present invention relates to a hydraulic system for driving an axial piston type hydraulic motor(referred to hereinafter a hydraulic motor).

2. Description of the Prior Art

A conventional axial piston type hydraulic motor is described in Korea patent application No. 95-23419.

As shown in FIG. 1, an axial piston type hydraulic motor according to the conventional invention comprises a housing 1; a cylinder block 2 which can rotate in the housing 1; a shaft 3 coupled to the cylinder block 2; cylinders 4*a*, 4*b* circularly arranged in the cylinder block 2; double-acting pistons 5*a*, 5*b* installed in the cylinders 4*a*, 4*b*; a pair of ports A, B for supplying the oil to the cylinders 4*a*, 4*b* and receiving the oil from the cylinders 4*a*, 4*b*; a valve plate 7 which connects the pair of ports A, B to the cylinders 4*a*, 4*b*; and a swash plate 6, whose base plane contacts one rod end of pistons 5*a*, 5*b*, and which can tilt at a right angle relative to the shaft 3.

According to the conventional axial piston type hydraulic motor constructed in the above, the hydraulic motor can rotate normally/reversely as the swash plate tilts normally/reversely at a right angle relative to the shaft, thereby allowing one of the pair of ports to be fixedly set as an inlet port and the other as an outlet port. Consequently port-changeover is not necessary to change the direction of the rotation of the hydraulic motor.

SUMMARY OF THE INVENTION

It is an object of the present invention to provide a hydraulic system for effectively driving an axial piston type hydraulic motor wherein a swash plate can tilt normally/reversely at a right angle relative to a shaft, and for preventing cavitation and turnover phenomenon.

The present invention provides a hydraulic system for driving an axial piston type hydraulic motor wherein the swash plate can tilt at a right angle relative to the shaft. The hydraulic system comprising: a swash plate cylinder; a double-acting swash plate piston disposed in the swash plate cylinder, having a rod connected to the swash plate; a pair of springs disposed in the swash plate cylinder for biasing the swash plate piston; a swash plate piston control valve for selectively connecting one of the swash plate piston chambers to a hydraulic pump or, alternatively, for interconnecting the chambers of the swash plate piston; an inlet passage installed between an inlet port of the hydraulic motor and a hydraulic pump; an outlet passage installed between an outlet port of the hydraulic motor and a tank; a main control valve installed in the inlet passage for opening or closing the inlet passage in response to a predetermined signal; a passage switching valve installed in the outlet passage for opening or shutting the outlet passage in response to a predetermined signal; a bypass passage installed in the outlet passage wherein each end of the bypass passage is connected to a predetermined position before and after the passage switching valve; and a relief valve installed in the bypass passage.

Preferably a remote control valve is adapted for sending the signals simultaneously to the swash plate piston control valve and to the main control valve.

Preferably the passage switching valve a relief valve which switched between a state where the outlet passage is opened and a state where the outlet passage is closed in response to a pressure increase in the inlet passage.

DETAILED DESCRIPTION OF THE INVENTION

In the following, one preferred embodiment of the present invention will be described in detail with reference to the accompanying drawings.

Figure 1:
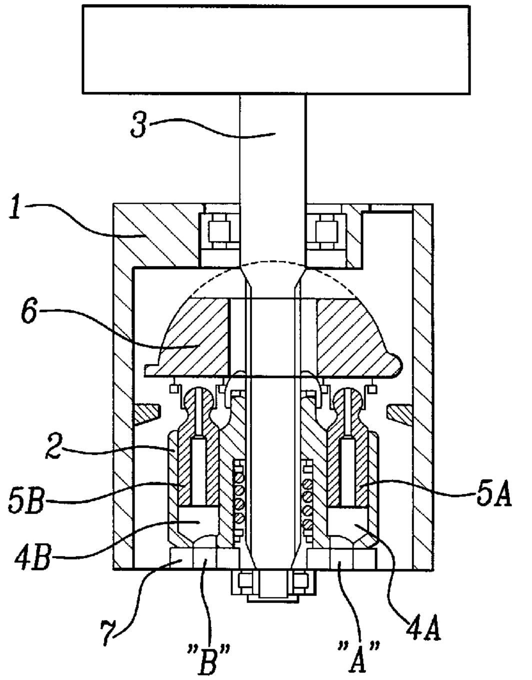
Fig-1 PRIOR ART
FIG. 1 is a sectional view showing the structure of a conventional axial piston type hydraulic motor according to a conventional invention.
Figure 2:
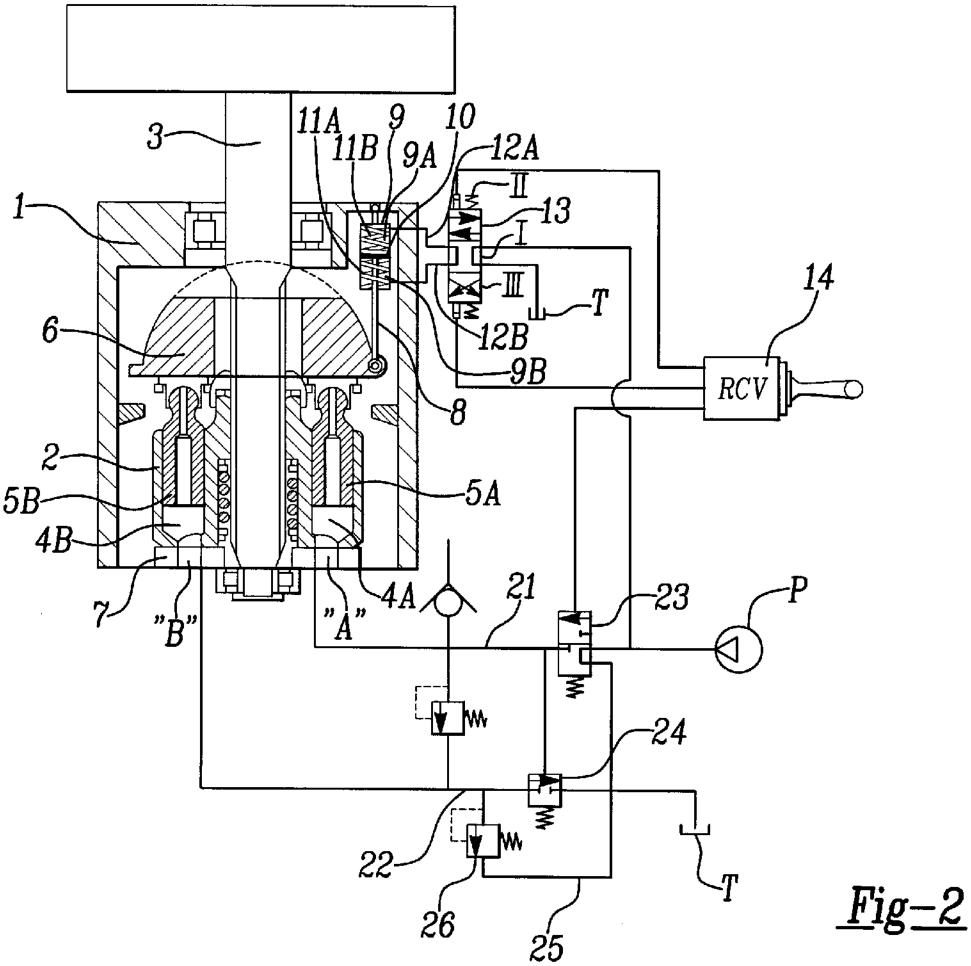
FIG. 2 is a hydraulic circuit diagram of a hydraulic system for driving an axial piston type hydraulic motor according to one embodiment of the present invention.

FIG. 2 illustrates a hydraulic system according to one embodiment of the present invention.

The hydraulic system according to this embodiment adopts the same hydraulic motor according to the conventional invention. The hydraulic motor comprises a housing 1; a cylinder block 2 which is installed rotatably in the housing 1; a shaft 3 coupled to the cylinder block 2; cylinders 4*a*, 4*b* circularly arranged in the cylinder block 2; reciprocating pistons 5*a*, 5*b* installed in the cylinders 4*a*, 4*b*; a pair of ports A, B for supplying an oil to the cylinders 4*a*, 4*b* and receiving the oil from the cylinders 4*a*, 4*b*; a valve plate 7 which connects the pair of ports A, B to the cylinders 4*a*, 4*b*; and a swash plate 6, whose base plane contacts one end of an acting rod of pistons 5*a*, 5*b*, and which can tilt at a right angle relative to the shaft 3.

The hydraulic system according to this invention has a swash plate cylinder 9. A double-acting swash plate piston 10 is installed in the swash plate cylinder 9 and includes a swash plate rod 8 connected to the swash plate 6 thereby forming two chambers 9*a* and 9*b*. The swash plate piston 10 can be biased by a pair of springs 11*a*, 11*b* disposed in each chamber of the swash plate cylinder 9*a*, 9*b*. As the swash plate piston 10 reciprocates the swash plate 6 tilts in a clockwise or counterclockwise direction. When the swash plate piston 10 is in a neutral state, the swash plate 6 and the swash plate piston 10 are set such that the swash plate 6 is at a right angle relative to the shaft.

A pair of oil passages 12*a*, 12*b* and a swash plate piston control valve 13 are installed for moving the swash plate piston 10 in the swash plate cylinder 9. The valve 13 opens or closes the pair of oil passages 12*a*, 12*b* which connects a hydraulic pump P to a pair of chambers 9*a*, 9*b* of the swash plate cylinder 9 in response to a predetermined signal. The valve 13 can be switched between (1) a neutral state wherein oil passages 12*a*, 12*b* are in fluid communication (Position I, FIG. 2); (2) a second state wherein the oil passage 12*a* connects the chamber 9*a* to a hydraulic pump P, and the oil passage 12*b* connects the chamber 9*b* to a tank T (Position II, FIG. 2); and (3) a third state wherein the oil passage 12*b* connects the chamber 9*b* to the hydraulic pump P, and the oil passage 12*a* connects the chamber 9*a* to the tank T (Position III, FIG. 2).

An inlet passage 21 is installed between the hydraulic pump P and the inlet port A, and an outlet passage 22 is installed between the tank T and the outlet port B. A main control valve 23 is installed in the inlet passage 21 for opening or closing the inlet passage 21 in response to a predetermined signal. A passage switching valve 24 is installed in the outlet passage 22 for opening or closing the outlet passage 22 in response to a predetermined signal. A bypass passage 25, each end of which is connected to a predetermined position before and after the passage switching valve 24, is installed in the outlet passage 22. A relief valve 26 is installed in the bypass passage 25.

A remote control valve 14 is installed for simultaneously sending the predetermined signal to the swash plate piston control valve 13 and to the main control valve 23. When a user manipulates the remote control valve 14 for driving the hydraulic motor, the main control valve 23 opens the inlet passage 21, and the oil discharged by the hydraulic pump P is supplied to the inlet port A. At the same time, the swash plate 6 tilts when the remote control valve 14 sends the signal to the swash plate piston control valve 13, the oil discharged by the hydraulic pump P is supplied to one of the pair of chambers 9*a*, 9*b* of the swash plate cylinder 9.

The passage switching valve 24 can be switched over to a state where the outlet passage 22 is opened in response to a pressure increase in the inlet passage 21 between the main control valve 23 and the inlet port A.

The operation and effect of this embodiment will be described below.

In the case where the hydraulic motor rotates normally, the remote control valve 14 sends a pressure signal to the main control valve 23. Accordingly the main control valve 23 opens the inlet passage 21, and the oil discharged by the hydraulic pump P is supplied to the inlet port A through the opened inlet passage 21. The oil is returned through the outlet passage 22 via the passage switching valve 24 which is switched over to the first state where the outlet passage 22 is opened in response to a pressure increase in the inlet passage 21. At the same time, the remote control valve 14 sends a pressure signal to one end of a spool of the swash plate piston control valve 13, whereby the valve 13 is switched over to the first state from the neutral state. Accordingly, the oil discharged by the hydraulic pump P is supplied to one chamber 9*a* of the swash plate cylinder 9 through the inner passage of the valve 13 which is switched over to the first state and through the passage 12*a*. The swash plate piston 10 moves downward against the spring 11*a* as shown in FIG. 2. As the swash plate piston 10 moves, the swash plate 6 coupled to the swash plate piston 10 tilts normally, and the hydraulic motor rotates normally.

In case when the hydraulic motor rotates reversely, the remote control valve 14 sends a pressure signal to the main control valve 23. Accordingly the main control valve 23 opens the inlet passage 21, and the oil discharged by the hydraulic pump P is supplied to the inlet port A through the opened inlet passage 21. The oil is returned through the outlet passage 22 via the passage switching valve 24 which is switched over to a state where the outlet passage 22 is opened in response to a pressure increase in the inlet passage 21. At the same time, the remote control valve 14 sends a pressure signal to the other end of the spool of the swash plate piston control valve 13, the valve 13 is switched over to the second state from the neutral state. Accordingly, the oil discharged by the hydraulic pump P is supplied to the other chamber 9*b* of the swash plate cylinder 9 through the inner passage of the valve 13 which is switched over to the second state and through the passage 12*b*. The swash plate piston 10 moves upward against the spring 11*b* as shown in FIG. 2. As the swash plate piston 10 moves, the swash plate 6 coupled to the swash plate piston 10 tilts reversely, and the hydraulic motor rotates reversely.

In case when the hydraulic motor is stopped, the remote control valve 14 stops sending signals to the main control valve 23. Accordingly the main control valve 23 closes the inlet passage 21, the passage switching valve 24 is switched over to a state where the outlet passage 22 is closed in response to a pressure drop in the inlet passage 21. The oil is returned from the outlet port B through the bypass passage 25 and the relief valve 26 installed in the bypass passage 25. At the same time, the remote control valve 14 stops sending a pressure signal to the spool of the swash plate piston control valve 13 so that the valve 13 may be switched over to the neutral state. And also, the oil discharged by the hydraulic pump P is returned directly to the tank T. Accordingly, the pair of chambers 9*a*, 9*b* of the swash plate cylinder 9 are connected to each other through the inner passage of the valve 13 which is switched over to the neutral state, thereafter the oil is exchanged between the chambers 9*a*, 9*b*. The swash plate piston 10 is returned to the neutral position by the springs 11*a*, 11*b*, thereby positioning the swash plate 6 at a right angle relative to the shaft 3. Although the hydraulic motor continues to rotate when the swash plate 6 is at a right angle relative to the shaft 3, the pistons 5*a*, 5*b* can be stopped completely. Because both oil shortage of the inlet port A and spontaneous pressure of the outlet port B does not occur, cavitation and turnover phenomenon can be prevented.

As described in the above, according to the present invention, a hydraulic system is provided for effectively driving an axial piston type hydraulic motor wherein a swash plate can tilt normally/reversely at a right angle to a shaft, and for preventing cavitation and turnover more effectively.

What is claimed is:

1. A hydraulic system for driving an axial piston type hydraulic motor having a swash plate pivotably rotatable relative to a shaft, a cylinder block coupled to the shaft, and a plurality of reciprocating pistons being disposed in the cylinder block and further coupled to the swash plate, the hydraulic system comprising:

a cylinder;

a swash plate piston received within said cylinder, said swash plate piston dividing said cylinder into a first chamber and a second chamber;

a rod connecting said swash plate piston and the swash plate;

a pair of springs disposed within each chamber, said springs exerting biasing forces on said swash plate piston;

a first fluid passage connected to said first chamber;

a second fluid passage connected to said second chamber;

a piston control valve for selectively connecting said first and second fluid passages to a hydraulic pump and a tank or, alternatively, connecting said first fluid passage to said second fluid passage;

an inlet passage provided between an inlet port of the hydraulic motor and said hydraulic pump;

an outlet passage provided between an outlet port of the hydraulic motor and said tank;

a main control valve provided within said inlet passage for selectively opening said inlet passage in response to a predetermined signal; and a remote control valve outputting a predetermined signal to said piston control valve and said main control valve.

2. The hydraulic system of claim 1, further comprising:

a passage switching valve installed within said outlet passage for selectively opening said outlet passage in response to fluid pressure between said main control valve and said inlet port of the hydraulic motor.

3. The hydraulic system of claim 2 wherein said passage switching valve is a relief valve opened when the pressure between said main control valve and said inlet port of the hydraulic motor exceeds a predetermined level.

* * * * *